United States Patent [19]

Zweighaft

[11] Patent Number: 4,885,676

[45] Date of Patent: Dec. 5, 1989

[54] CONTROL LOOP INSTABILITY DETECTION AND CORRECTION APPARATUS

[75] Inventor: James Zweighaft, Boulder, Colo.

[73] Assignee: Storage Technology Corporation, Louisville, Colo.

[21] Appl. No.: 166,262

[22] Filed: Mar. 10, 1988

[51] Int. Cl.$^4$ ............................................. G05B 21/02
[52] U.S. Cl. .................... 364/178; 364/176; 364/183; 364/184; 364/153; 318/563; 318/611; 318/635
[58] Field of Search ............... 364/183, 184, 185, 178, 364/153, 154, 176, 177; 318/611, 635, 624, 563, 565

[56] References Cited

U.S. PATENT DOCUMENTS

| | | | |
|---|---|---|---|
| 3,724,720 | 4/1973 | Bullivant | 364/183 |
| 3,974,364 | 8/1976 | Sallberg | 364/176 |
| 4,124,848 | 11/1978 | Clark et al. | 364/423 |
| 4,344,128 | 8/1982 | Frye | 364/153 |
| 4,347,572 | 8/1982 | Berwick, Jr. et al. | 364/435 |
| 4,374,423 | 2/1983 | Kundler et al. | 318/563 |
| 4,404,505 | 9/1983 | Swanson et al. | 364/174 |
| 4,631,683 | 12/1986 | Thomas et al. | 364/183 |
| 4,730,313 | 3/1988 | Stephenson et al. | 371/15 |
| 4,742,465 | 5/1988 | Eastman | 364/183 |
| 4,774,669 | 9/1988 | Schmitz et al. | 364/436 |

*Primary Examiner*—John R. Lastova

*Attorney, Agent, or Firm*—Dorr, Carson, Sloan & Peterson

[57] ABSTRACT

The control loop instability detection and correction apparatus monitors an error signal produced by a control system to detect any instability in the control loop before the instability significantly affects the performance of the controlled apparatus. This is accomplished by monitoring the error signal to detect a change in the error signal greater than a predetermined limit and to tabulate the number of times the change in the error signal is in excess of the predetermined limit over a fixed period of time. Whenever the change in the error signal is in excess of the predetermined limit, it is reduced in magnitude to a predetermined value and this resultant signal is applied to the controlled apparatus in place of the originally generated error signal. In addition during each sampling time interval, the result of this comparison is used to increment or decrement a counter. If the change in the error signal is in excess of the predetermined limit, the counter is incremented to indicate the number of times that the change in the error signal has exceeded the predetermined limit. If, on the other hand, the change in the error signal is less than the predetermined limit the counter is decremented to indicate that the error signal is within the allowable limits of magnitude. If this count tabulated by the counter exceeds a predefined threshold, an alarm indication is activated to note possibility of instability in the operation of the controlled apparatus.

15 Claims, 2 Drawing Sheets

CONTROL LOOP INSTABILITY DETECTION AND CORRECTION APPARATUS

FIELD OF THE INVENTION

This invention relates to servo control systems and, in particular, to apparatus for providing stability to the control loop to regulate the operation of the servo mechanism.

Problem

It is a problem in controlled systems, such as servo systems, to regulate the operation of the controlled system without encountering any instability. A typical controlled system includes a controller that generates control signals to regulate the operation of the controlled apparatus. The controller outputs digital control signals to a drive amplifier which converts the digital control signals into an analog drive signal, such as an electrical current, to activate the controlled apparatus. The output of the controlled apparatus is typically fed back to the controller to compare the actual operation of the controlled apparatus with data stored in the memory of the controller that is indicative of the expected operation of the controlled apparatus. Any discrepancy between the actual and expected operation of the controlled apparatus is compensated for by the generation of an error signal by the controller to offset the error in the actual operation of the controlled apparatus.

This feedback loop can compensate for any errors in the actual operation of the controlled apparatus but also can introduce instability into the system. This instability can be due to either the magnitude of the error signal generated by the controller or the cumulative effect of a number of sequentially applied error signals all in the same sense and of sufficient magnitude to cause the controlled system to significantly deviate from its expected performance. In addition, the controller does not detect oscillations where the polarity of the error signal changes at an excessive frequency. Thus, it is a problem in such a system to avoid the instability caused by the feedback of the output signal from the controlled apparatus to the controller for the generation of an error signal.

Solution

These problems are solved and a technical advance achieved in the field by the control loop instability detection and correction apparatus of the present invention. This control loop instability detection and correction apparatus monitors the error signal produced by the controller to detect any instability in the control loop before the instability significantly affects the performance of the controlled apparatus. This is accomplished by monitoring the error signal to detect and correct changes in the polarity of an error signal greater in magnitude than a predetermined value and to tabulate the number of times the error signal exceeds this predetermined value over a fixed period of time.

The error signal generated in a sampling interval is compared with the error signal generated in the previous sampling interval. The error signal is not permitted to change in polarity or direction and by more than a predetermined value for the successive sampling interval. Whenever the change in the error signal in successive sampling intervals is in excess of the predetermined value, it is reduced in magnitude to the predetermined value. This resultant error signal is combined with other terms and applied to the controlled apparatus in place of the originally generated error signal. In addition, during each sampling time interval, the result of this comparison is used to increment or decrement a counter. If the change in the error signal in successive sampling intervals is in excess of the predetermined value, the counter is incremented to indicate the number of times that the change in the error signal has exceed the predetermined value over some interval of time. If, on the other hand, the change in the error signal in successive sampling intervals is less than the predetermined value, the counter is decremented to indicate that the magnitude of the change in the error signal is within the allowable limits.

If this count tabulated by the counter exceeds a predefined threshold, an alarm indication is activated to note the possibility of instability in the operation of the controlled apparatus. This is due to the fact that the direction and the magnitude of the change in the error signal in successive sampling intervals is in excess of the predetermined value more often than it is less than the predetermined value by a certain number of times. Thus, this control system not only compensates for potential instability on a sampling interval basis but also monitors the long-term activity of the controlled apparatus to detect an instability situation that manifests itself over a large number of sampling intervals. This and other advantages and features of this control loop instability detection and correction apparatus will be described in the following detailed description.

DETAILED DESCRIPTION OF THE DRAWING

Figure 1:
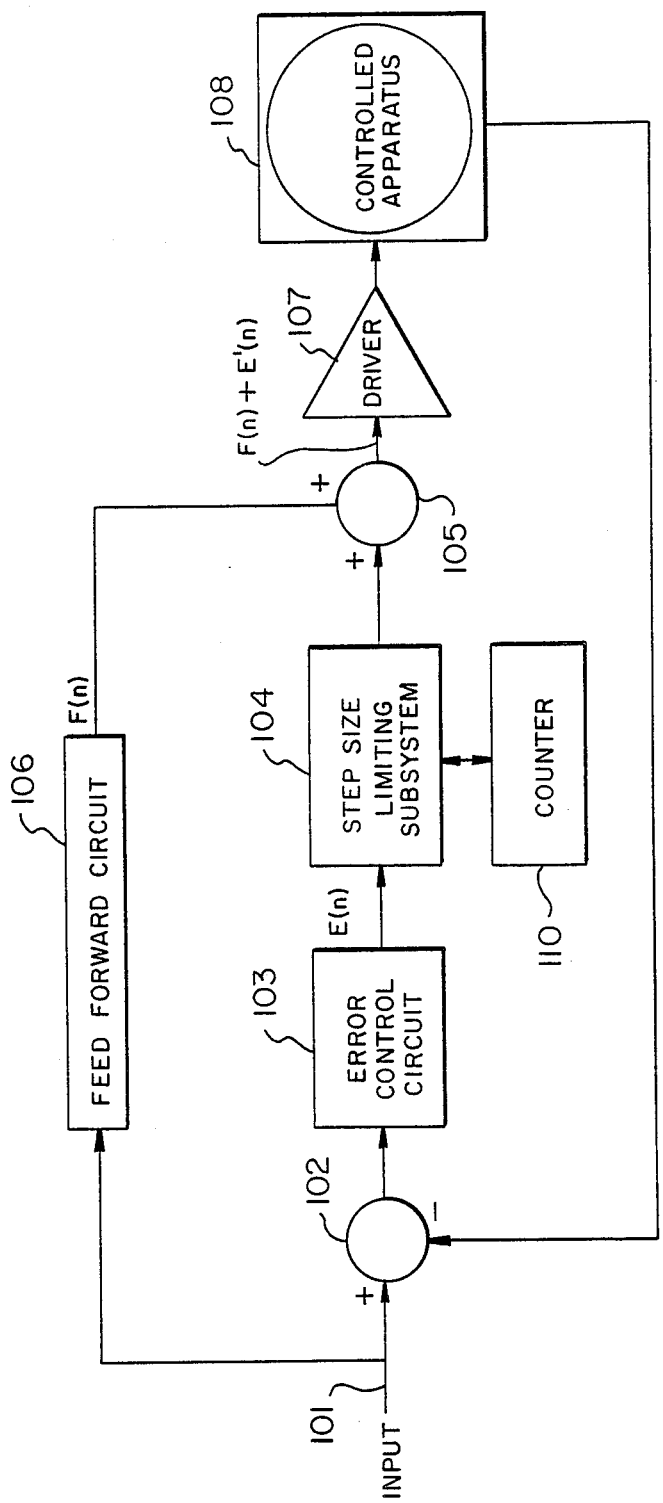
FIG. 1 illustrates in block diagram form the architecture of the control loop instability detection and correction apparatus.

FIG. 1 illustrates the control system and the control loop instability detection and correction apparatus in block diagram form. Controller 100 receives a selection signal input on lead 101 to indicate the operation to be performed by controlled apparatus 108. Controller 100 outputs control signals indicative of the selected operation to driver circuit 107 which converts the control signals into a drive signal, such as an electrical current, that is applied to the input of controlled apparatus 108. Controlled apparatus 108, in response to the control signal from driver 107, performs the selected operation and produces an output signal on lead 109. The output signal on lead 109 is fed back to controller 100 for performance monitoring and error control purposes.

Controller 100 consists of a plurality of elements. Feed forward subsystem 106 converts the selection signals input on lead 101 that designate the operation to be performed by controlled apparatus 108 into control signals F(n) that are applied to summing circuit 105. The output of summing circuit 105 is applied to driver circuit 107 which converts the control signal received from summing circuit 105 into a drive signal that is applied to controlled apparatus 108.

Error Correction Circuit

Error correction circuitry is also provided in controller 100 and consists of a plurality of elements that function to compensate for any error in the actual operation of controlled apparatus 108 in comparison with the designated operation noted by the selection signal input on lead 101. This error correction circuitry includes comparator 102 which compares the output signal of controlled apparatus 108 on lead 109 with the selection signal input on lead 101. The result of this comparison is an error signal indicative of the deviation between the actual performance of controlled apparatus 108 and the desired performance as noted by the selection signal on input lead 101. This error signal is applied to error control subsystem 103 which converts the error signal into an error control signal $E(n)$.

Step Size Limiting Subsystem

This error control signal $E(n)$ is applied to step size limiting subsystem 104 which functions to compare the error control signal $E(n)$ with a predetermined limit called the STEP LIMIT. The STEP LIMIT is the value of the maximum allowable correction change to the operation of controlled apparatus 108 that is permitted in one sampling interval. This predetermined limit (STEP LIMIT) provides short term (on a sampling interval basis) stability to the control loop instability detection and correction apparatus. If the change in the error control signal $E(n)$ from one sampling interval to the next exceeds this predetermined limit (STEP LIMIT), the error control signal $E(n)$ is reduced in magnitude to the value of the previous sampling interval error control signal $E(n-1)$ plus the predetermined limit (STEP LIMIT).

In addition, step size limiting subsystem 104 tabulates the number of times that the change in the magnitude of the error control signal $E(n)$ is in excess of this predetermined limit (STEP LIMIT). This tabulation is accomplished by incrementing a counter 110 every time the change in the magnitude of the error control signal $E(n)$ is in excess of the predetermined limit (STEP LIMIT) and decrementing the counter 110 every time the change in the magnitude of the error control signal $E(n)$ is below the predetermined limit (STEP LIMIT). Thus, the counter 110 maintains a tabulation that indicates on a long-term basis the stability of the control apparatus. If the number stored in counter 110 exceeds a predefined threshold (TOL), step size limiting subsystem 104 generates an alarm indication to indicate that the controlled apparatus 108 is suffering from an instability problem.

The comparison operation performed by step size limiting subsystem 104 is a calculation of the difference between the error control signal $E(n)$ for the present sampling interval (n) and the error control signal $E(n-1)$ for the previous sampling interval (n−1). This error control signal cannot change polarity and exceed a predetermined step size (STEP LIMIT) in magnitude. If the difference is greater than predetermined limit (STEP LIMIT), then the change in the error control signal is reduced in magnitude to the value STEP LIMIT. The output of step size limiting subsystem 104 is $E'(n)$ therefore the lesser of the error control signal $E(n)$ for the present sampling interval and the error control signal for the previous sampling interval $E(n-1)$ plus the predetermined value (STEP LIMIT) for maximum step size. This signal generated by step size limiting subsystem 104 $E(n)$ is output to summing circuit 105 where it is combined with the control signal $F(n)$ output by feed forward subsystem 106. As noted above, the output of summing circuit 105 is a control signal $(E'(n)+F(n))$ that driver 107 converts into a drive signal (such as a drive current) that is applied to controlled apparatus 108 to activate controlled apparatus 108 to perform the designated operation.

Flow Diagram

Figure 2:
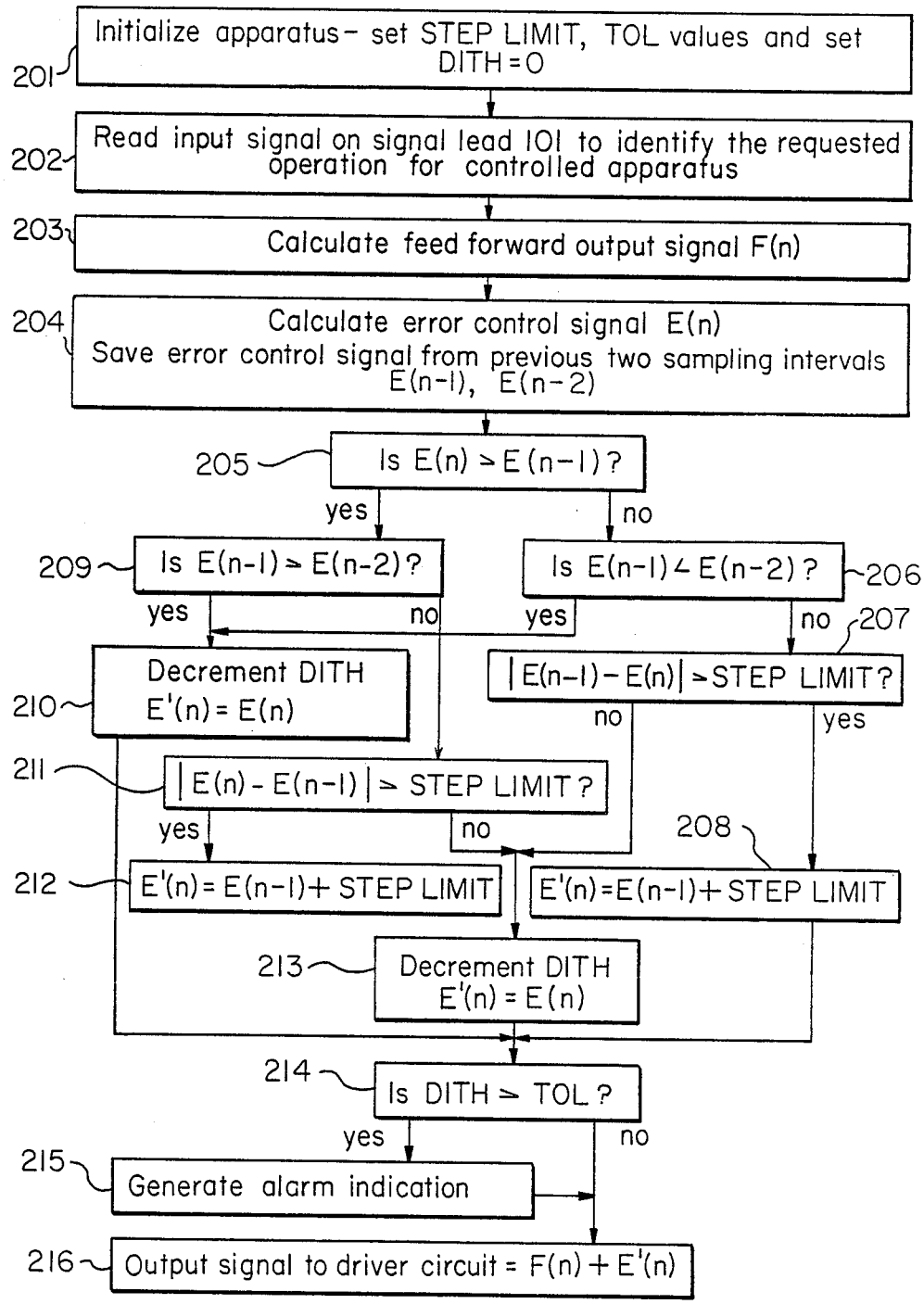
FIG. 2, illustrates in flow diagram form the operation of the control loop instability detection and correction apparatus.

The operation of the control loop instability detection and correction apparatus can better be understood by reference to FIG. 2 which illustrates the operation of the control loop instability detection and correction apparatus in flow diagram form. Step 201 on FIG. 2 represents system initialization, where data representative of the maximum allowable change (STEP LIMIT) in the error control signal $E(n)$ for successive sampling periods as well as the predefined threshold (TOL) for counter 110 are input to step size limiting subsystem 104. In addition, the count variable in counter 110 represented by the variable DITH is reset to zero. At step 202, controller 100 reads the selection signal data input on least 101 which data are indicative of the operation to be performed by controlled apparatus 108. At step 203, feed forward subsystem 106 uses the selection signal data read on input lead 101 to calculate the control signal $F(n)$ to regulate the operation of controlled apparatus 108 to perform the operation designated by the data on system input lead 101. At step 204, comparator 102 and error control subsystem 103 calculate the error control signal $E(n)$. This error control signal results from a comparison of the selection signal data on input lead 101 with the output signal obtained from controlled apparatus 108 on signal lead 109. As noted above, the output of comparator 102 is input to error control subsystem 103 which converts the difference signal produced by comparator 102 into an error control signal $E(n)$.

Analysis of Error Control Signal $E(n)$

The error control signal $E(n)$ can have long term or short term instability. Short term instability is typically an error control signal that changes polarity by an excessive amount during a single sampling interval. Long term instability is indicated by an excessive number of sampling intervals in which the error control signal changes polarity by an excessive amount. Step size limiting subsystem 104 first detects and corrects short term instability. At step 205, step size limiting subsystem 104 compares the error control signal for the present sampling interval $E(n)$ with the error control signal from the previous sampling interval $E(n-1)$. If the error control signal for the present sampling interval $E(n)$ is not greater than the error control signal for the previous sampling interval $E(n)$, there is a decrease in the error control signal. Step size limiting subsystem 104 advances to step 206 where data representative of the error control signals for the previous two sampling intervals are compared to determine whether there has been a change in the polarity of the error control signal. Step size limiting subsystem 104 determines the error control signal of the next previous sampling interval $E(n-1)$ was greater than the error control signal for the sampling interval $E(n-2)$ two intervals prior to the present sampling interval. This is represented in step 206 as the comparison $E(n-1)$ less than $E(n-2)$. If the error control signal for the last sampling interval $E(n-1)$ is greater than the error control signal of the sampling interval two sample periods prior to the present sampling interval $E(n-2)$ then a polarity change in the error control signal has taken place and processing advances to step 207 where a comparison is made of the error control signal from the previous sampling interval with the present sampling interval, as represented in FIG. 2 by $|E(n-1)-E(n)|$. If the number resulting from this comparison is greater than the allowed step size or predetermined limit STEP LIMIT, the error control signal for the present sampling interval E(n) is reduced in magnitude to equal the error control signal for the next prior sampling interval E(n−1) plus the allowable step size STEP LIMIT. In addition the variable DITH in counter 110 is incremented to indicate the need for corrective action in this sampling interval. Processing then advances to step 214 which will be described below.

If the comparison at step 207 indicates that the magnitude of the difference between the error control signal for the present sampling interval E(n) and the error control signal from the previous sampling interval E(n−1) is not in excess of the allowable step size or predetermined limit STEP LIMIT, then processing advances to step 213 where the variable DITH in counter 110 is decremented to indicate that in this sampling interval the error control signal E(n) did not exceed the predetermined limit STEP LIMIT. Processing advances from step 213 to step 214 as will be described below.

If, at step 206, the comparison of the error control signals for the previous two sampling intervals E(n−1), E(n−2) is such that the error control signal for the last sampling interval E(n−1) is less than the error control signal for the sample interval two sampling periods ago E(n−2), then there is no change in the polarity of the error control signal and processing advances to step 210 where the variable DITH's in counter 110 is decremented. Processing then advances to step 214 as will be described below.

If, at step 205, the comparison of the error control signal for the present interval E(n) with the error control signal for the previous sampling interval E(n−1) is such at the error control signal of the present interval E(n) is greater than the error control signal of the previous sampling interval E(n−1), then processing advances to step 209 where the error control signal for the previous two sampling intervals is compared. If the error control signal for the last previous sampling interval E(n−1) is less than the error control signal for the sample interval two sampling periods ago E(n−2), then there is no change in the polarity of the error control signal and processing advances to step 210 where the variable DITH in counter 110 is decremented. Then processing advances to step 214 as will be described below.

However, if at step 209 the error control signal for the previous sampling interval E(n−1) is greater than the error control signal for the sample interval two sampling periods ago E(n−2), then there has been a change in the polarity of the error control signal and processing advances to step 211 where the error control signal for the present sampling interval E(n) is compared with the error control signal for the last previous sampling interval E(n−1). If the magnitude of the difference between these two error control signals is not greater than the predefined limit STEP LIMIT, then processing advances to step 213 where the variable DITH in counter 110 is decremented. Processing then advances to step 214 as will be described below.

However, if the comparison at step 211 is such that the magnitude of &:he difference between the error control signal for the present sampling interval E(n) and the error control signal for the previous sampling interval E(n−1) is greater than the allowable step size or predetermined limit STEP LIMIT, then processing advances to step 212 where the error control signal for the present sampling interval E(n) is modified to be equal to the error control signal for the previous sampling interval E(n−1) plus the allowable step size STEP LIMIT. In addition, the variable DITH in counter 110 is incremented to indicate that the error control signal for the present sampling interval E(n) has changed polarity and exceeded the predetermined threshold STEP LIMIT. Processing then advances to step 214.

Long Term Instability

Long term instability in a controlled apparatus typically manifests itself as the frequent occurrence of an error control signal that changes polarity and the magnitude of the change in successive sampling intervals is in excess of the allowable step size or predetermined limit STEP LIMIT. This type of instability is not detected or corrected by existing control apparatus. In this apparatus, at step 214, the count tabulated by the variable DITH in counter 110 is compared to the predetermined threshold TOL. If the count tabulated in counter 110 has not exceeded this threshold TOL then processing advances to step 216. However, if the count in counter 110 has exceeded this predetermined threshold TOL, processing advances to step 215 where an alarm indication is generated by controller 100 to note that an instability situation in controlled apparatus 108 has been detected. The frequent occurrence of polarity changes of excessive magnitude in the error control signal is therefore an indicia of a potential instability in controlled apparatus 108. The sensitivity of the control loop instability detection and correction apparatus is controllable by setting the threshold variable TOL. Processing then advances to step 216 where step size limiting subsystem 104 outputs error control signal E'(n) to summing circuit 105 where it is added to feed forward control signal F(n). The output of summing circuit 105 (E'(n)+F(n)) is applied to driver 107 which converts this signal into a drive signal to activate controlled apparatus 108.

Thus, the control loop instability detection and correction apparatus provides control of both short term and long term instability by regulating both the magnitude of the change in the error control signal and the frequency of changes in the error control signals of excessive magnitude respectively. This dual control function provides a level of instability control unavailable in existing control systems.

While a specific embodiment of this invention has been disclosed herein, it is expected that those skilled in the art can design other embodiments that differ from this particular embodiment but fall within the scope of the appended claims.

I claim:

1. In a digital control system that, on a periodic sampling interval basis, regulates the operation of a controlled apparatus, a method of providing control loop stability comprising the steps of:
    periodically sampling said controlled apparatus to compare the state of said controlled apparatus in the present sampling interval with the expected state of said controlled apparatus;

generating an error control signal to adjust the operation of said controlled apparatus;

calculating the difference between said error control signal for the present sampling interval and said error control signal for the previous sampling interval; and reducing said error control signal for the present sampling interval to equal the error control signal for the previous sampling interval plus a predetermined maximum step size when said difference exceeds said predetermined maximum step size.

2. The method of claim 1 further including the steps of:

tabulating the number of times that said error control signal exceeds a predetermined limit in a given time; and producing a loop instability signal when said number is in excess of a predetermined threshold.

3. The method of claim 1 further including the step of:

activating an alarm to signal the presence of said loop instability signal.

4. The method of claim 1 further including the step of:

terminating the operation of said controlled apparatus in response to said loop instability signal.

5. The method of claim 1 wherein the step of tabulating includes:

incrementing a count each time that said error control signal exceeds said predetermined limit during one of said sampling intervals; and decrementing said count each time that said error control signal does not exceed said predetermined limit during one of said sampling intervals.

6. In a digital control system which, on a periodic sampling interval basis, regulates the operation of a controlled apparatus, a control loop instability detection and correction apparatus comprising:

means for periodically sampling said controlled apparatus to determine the difference between the state of said controlled apparatus during the present sampling interval and the expected state of said controlled apparatus;

means responsive to said determined difference for generating an error control signal to regulate the operation of said controlled apparatus;

means for calculating the difference between said error control signal for the present sampling interval and said error control signal for the previous sampling interval;

means for reducing said error control signal for the present sampling interval to equal the error control signal for the previous sampling interval plus a predetermined maximum step size when said difference exceeds said predetermined maximum step size.

7. The apparatus of claim 6 further including:

means for tabulating the number of times that the change in said error control signal in successive sampling intervals exceeds a predefined magnitude during a designated time interval; and means responsive to said number being greater than a predefined limit for producing a loop instability indication.

8. The apparatus of claim 6 further including:

means responsive to said loop instability indication for terminating the operation of said controlled apparatus.

9. The apparatus of claim 6 wherein said tabulating means includes:

means for storing an indication of the number of times that said change in said error control signal in successive sampling intervals exceeds a predefined magnitude during a designated time interval.

10. The apparatus of claim 9 wherein said tabulating means further includes:

means for incrementing said indication in response to said change in said error control signal exceeding said predefined limit during one of said sampling intervals; and means for decrementing said indication in response to said change in said error control signal not exceeding said predefined limit during one of said sampling intervals.

11. A control system for regulating the operation of a controlled apparatus on a periodic sampling interval basis comprising:

means for determining the state of said controlled apparatus during the present sampling interval;

means for producing a control signal to activate said controlled apparatus to perform the next step in its stepwise operation;

means for generating an error control signal indicative of the difference between said determined state during the present sampling interval and an ideal state during the present sampling interval;

means for calculating the difference between said error control signal for the present sampling interval and said error control signal for the previous sampling interval;

means for reducing said error control signal for the present sampling interval to equal the error control signal for the previous sampling interval plus a predetermined maximum step size when said difference exceeds said predetermined maximum step size;

and means responsive to said reducing means for modifying said control signal by an amount equal to said error control signal.

12. The system of claim 11 further comprising means for tabulating the number of times said error control signal exceeds said predetermined limit; and means responsive to said tabulating means for terminating the operation of said system when said tabulated number exceeds a predetermined threshold.

13. The system of claim 11 further comprising:

means for tabulating the number of times said error control signal exceeds said predetermined limit; and means responsive to said tabulating means for generating an alarm indication when said tabulated number exceeds a predetermined threshold.

14. The system of claim 13 wherein said tabulating means includes:

means responsive to said error control signal exceeding said predetermined limit during as sampling interval for incrementing said tabulated number; and means responsive to said error control signal not exceeding said predetermined limit during a sampling interval for decrementing said tabulated number.

15. In a digital control system which, on a periodic sampling interval basis, regulates the operation of a controlled apparatus, a control loop instability detection and correction apparatus comprising:

means for periodically sampling said controlled apparatus to determine the difference between the present state of said controlled apparatus and the expected present state of said controlled apparatus;

means responsive to said determined difference for generating an error control signal to regulate the operation of said controlled apparatus;

means for storing an indication of the number of times that the change in said error control signal in successive sampling intervals exceeds a predefined limit during a designated time interval;

means for incrementing said number in response to said change in said error control signal exceeding said predefined limit during one of said sampling intervals;

means for decrementing said number in response to said change in said error control signal not exceeding said predefined limit during one of said sampling intervals;

means responsive to said number being greater than a predefined threshold for producing a loop instability indication;

calculating the difference between said error control signal for the present sampling interval and said error control signal for the previous sampling interval;

reducing said error control signal for the present sampling interval to equal the error control signal for the previous sampling interval plus a predetermined maximum step size when said difference exceeds said predetermined maximum step size; and means responsive to said loop instability indication for terminating the operation of said controlled apparatus.

* * * * *